US009148756B2

(12) United States Patent
Filipov

(10) Patent No.: US 9,148,756 B2
(45) Date of Patent: *Sep. 29, 2015

(54) OUTPUT OF CONTENT FROM THE INTERNET ON A MEDIA RENDERING DEVICE

(71) Applicant: FLIPPS MEDIA AD, Sofia (BG)

(72) Inventor: Metodi Filipov, West Islip, NY (US)

(73) Assignee: FLIPPS MEDIA AD (BG)

( * ) Notice: Subject to any disclaimer, the term of this patent is extended or adjusted under 35 U.S.C. 154(b) by 0 days.

This patent is subject to a terminal disclaimer.

(21) Appl. No.: 14/143,503

(22) Filed: Dec. 30, 2013

(65) Prior Publication Data

US 2014/0114768 A1    Apr. 24, 2014

Related U.S. Application Data

(63) Continuation of application No. 13/542,246, filed on Jul. 5, 2012, now Pat. No. 8,620,284, and a continuation of application No. 13/004,433, filed on Jan. 11, 2011, now Pat. No. 8,238,887.

(51) Int. Cl.
*H04M 3/42* (2006.01)
*H04W 24/00* (2009.01)
(Continued)

(52) U.S. Cl.
CPC ........... *H04W 4/02* (2013.01); *G06F 17/30887* (2013.01); *G06Q 30/0267* (2013.01); *H04L 12/281* (2013.01); *H04L 12/282* (2013.01); *H04L 12/2812* (2013.01); *H04L 65/1059* (2013.01); *H04L 65/4084* (2013.01);
(Continued)

(58) Field of Classification Search
CPC ................. H04L 12/281; H04L 29/06306
USPC ............. 455/414.3, 414.1, 456.3, 466, 556.1, 455/66.1, 41.3, 406; 725/93, 100; 380/204
See application file for complete search history.

(56) References Cited

U.S. PATENT DOCUMENTS

| 7,260,564 B1 | 8/2007 | Lynn et al. | |
| 2010/0180312 A1* | 7/2010 | Toya | 725/78 |
| 2011/0164187 A1* | 7/2011 | Lin | 348/734 |

FOREIGN PATENT DOCUMENTS

| EP | 2164258 A1 | 3/2010 |
| WO | 2010025048 A2 | 3/2010 |

OTHER PUBLICATIONS

European Search Report for EU application 12733880.4-1862/2664133 and International application PCT/US2012020331, dated May 28, 2014, 7 pages.

*Primary Examiner* — Kiet Doan
(74) *Attorney, Agent, or Firm* — Moritt Hock & Hamroff LLP; Steven S. Rubin, Esq.

(57) ABSTRACT

A system and method for controlling output of content on a media rendering device. A mobile phone may be effective to receive a request for content where the content is from a content processor. The mobile phone may be effective to generate a command based on the request, the command including a URL, the URL including an address of a gateway processor and an identification of the content processor. The mobile phone may be effective to send the command to the media rendering device. The media rendering device may be effective to send a request to the gateway processor using the URL. The gateway processor may be effective to receive the content from the content processor and send the content to the media rendering device. The media rendering device may be effective to output the content.

16 Claims, 4 Drawing Sheets

(51) Int. Cl.
  *H04W 4/02* (2009.01)
  *H04L 12/28* (2006.01)
  *H04L 29/06* (2006.01)
  *H04L 29/08* (2006.01)
  *G06F 17/30* (2006.01)
  *G06Q 30/02* (2012.01)
  *H04W 4/00* (2009.01)
  *H04N 21/472* (2011.01)
  *H04N 21/482* (2011.01)
  *H04N 21/858* (2011.01)
  *H04N 21/41* (2011.01)

(52) U.S. Cl.
  CPC .......... *H04L67/303* (2013.01); *H04N 21/4126* (2013.01); *H04N 21/472* (2013.01); *H04N 21/482* (2013.01); *H04N 21/8586* (2013.01); *H04W 4/00* (2013.01)

OUTPUT OF CONTENT FROM THE INTERNET ON A MEDIA RENDERING DEVICE

CROSS REFERENCE TO RELATED APPLICATIONS

This application is a continuation of co-pending U.S. application Ser. No. 13/542,246 filed Jul. 5, 2012 which is allowed and scheduled to issue as U.S. Pat. No. 8,620,284 on Dec. 31, 2013, which is a continuation of U.S. application Ser. No. 13/004,433 filed on Jan. 1, 2011, the entirety of which is hereby incorporated by reference.

BACKGROUND OF THE INVENTION

1. Field of the Invention

This disclosure relates to a system and method effective to enable a mobile phone to control a media rendering device to output content from the Internet.

2. Description of The Related Art

Referring to FIG. 1, there is shown a prior art system 50 effective to output content. In system 50, a user 52 may use a remote control 54 to control output of a television 58. Remote control 54 may send a command for television 58 to output content from a particular content processor. Television 58 may, in turn, forward the request over a cable line 60 or satellite 62 to a content processor 64. Content processor 64 may be in communication with a memory 66 including content 68. Content processor 64 may forward content 68 to television 58. Television 58 may output content 68 in the form of an image 56. This disclosure describes improvements over these prior art systems.

SUMMARY OF THE INVENTION

One embodiment of the invention is a method for controlling output of content. The method may comprise receiving, by a mobile phone, a request for content, the content being from a first processor; generating, by the mobile phone, a command based on the request, the command including a URL, the URL including a domain and an identification of the first processor; and sending, by the mobile phone, the command to a media rendering device.

Another embodiment of the invention is a method for controlling output of content. The method may comprise receiving, by a mobile phone, a request for content, the content being available from a first processor; and generating, by the mobile phone, a command based on the request, the command including a URL, the URL including a domain and an identification of the second processor. The method may further comprise sending, by the mobile phone, the command to a media rendering device; receiving, by a second processor from the media rendering device, a request at the domain; and sending, by the second processor to the media rendering device, the content.

Another embodiment of the invention is a system effective to control output of content. The system may comprise a mobile phone; and a first processor at a domain. The mobile phone may be effective to: receive a request for content, the content being from a second processor; generate a command based on the request, the command including a URL, the URL including the domain of the first processor and an identification of the second processor; and send the command to the media rendering device. The first processor may be effective to receive from the media rendering device, a request; and send the content to the media rendering device.

BRIEF DESCRIPTION OF THE DRAWINGS

The drawings constitute a part of the specification and include exemplary embodiments of the present invention and illustrate various objects and features thereof.

DETAILED DESCRIPTION OF THE PREFERRED EMBODIMENT(S)

Figure 1:
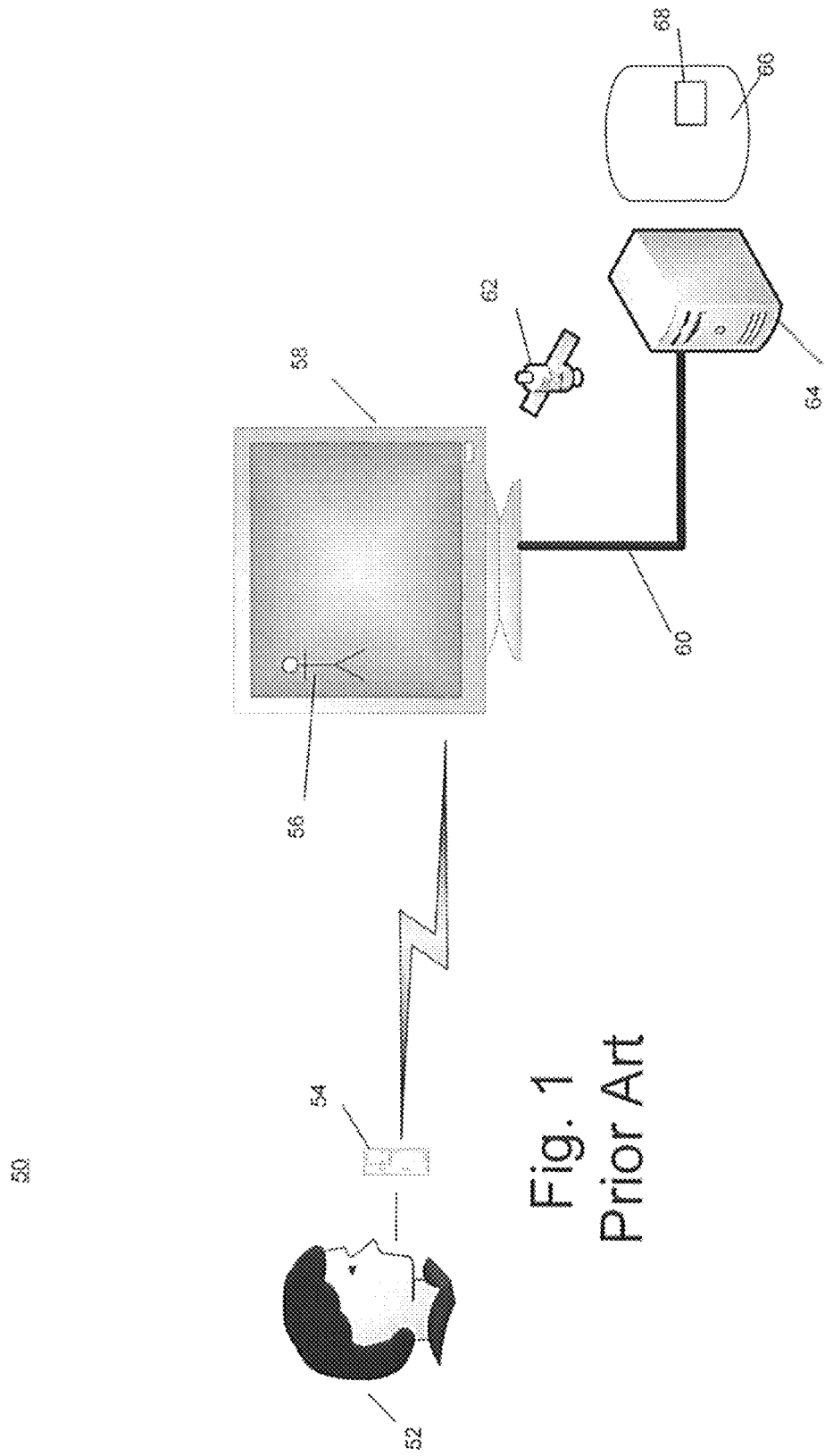
FIG. 1 is a system drawing of a system in accordance with the prior art.

Various embodiments of the invention are described hereinafter with reference to the figures. Elements of like structures or function are represented with like reference numerals throughout the figures. The figures are only intended to facilitate the description of the invention or as a guide on the scope of the invention. In addition, an aspect described in conjunction with a particular embodiment of the invention is not necessarily limited to that embodiment and can be practiced in conjunction with any other embodiments of the invention.

Figure 2:
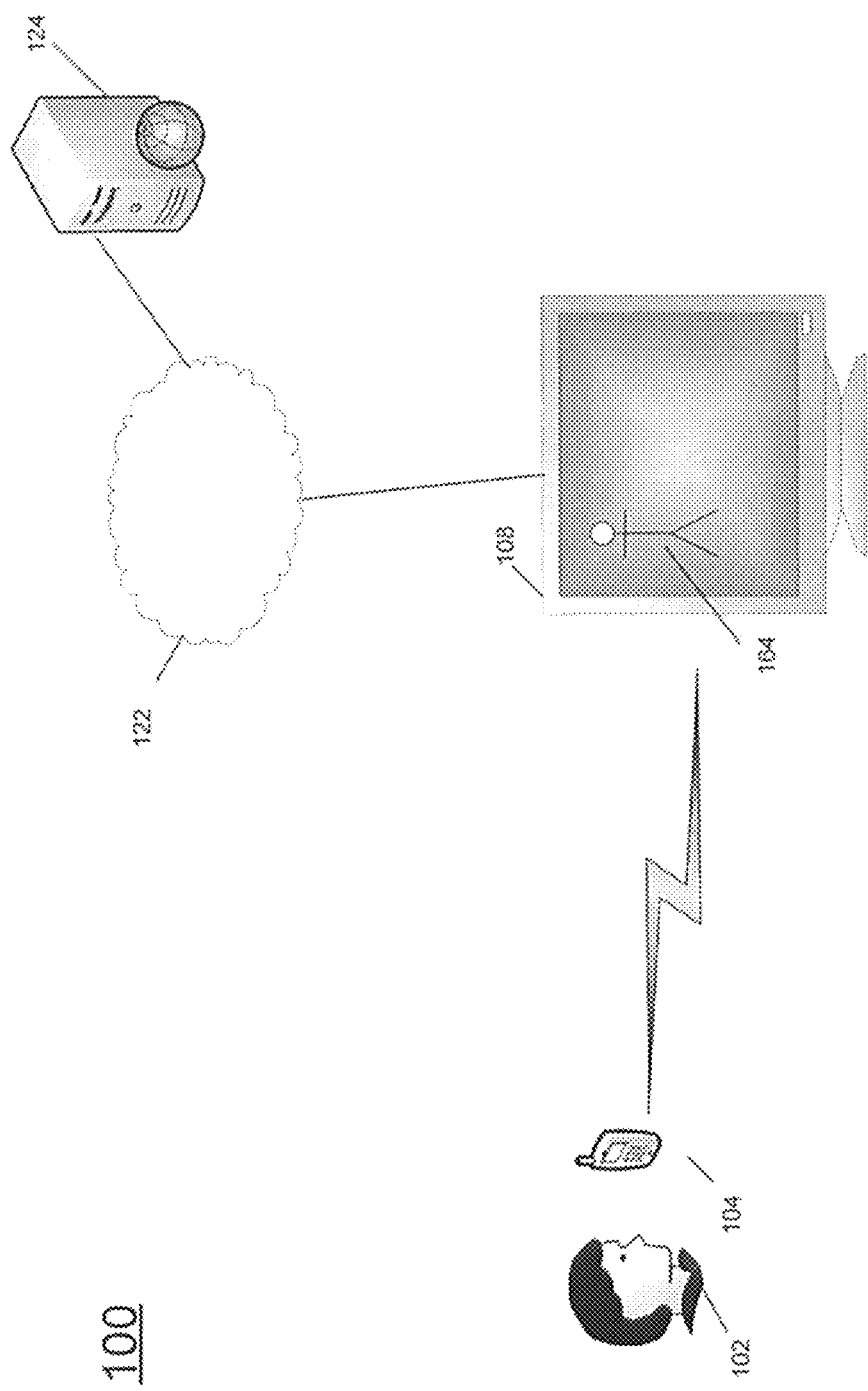
FIG. 2 is a system drawing of a system in accordance with an embodiment of the invention.

Referring to FIG. 2, there is shown a system 100 in accordance with an embodiment of the invention. As discussed in more detail below, in system 100, a user 102 may use a mobile phone 104 to control output of content, such as by an image 164, on a media rendering device 108. Media rendering device 108 may be any device connectable to the Internet, such as by wires or wireless, and capable of rendering audio, visual, or audio-visual content. The content may be sent over Internet 122 from a content processor 124. The content could be, for example, a combination of files including an image, a series of images, video, audio, etc. Content processor 124 may be any processor connected to the Internet and capable of providing content.

Figure 3:
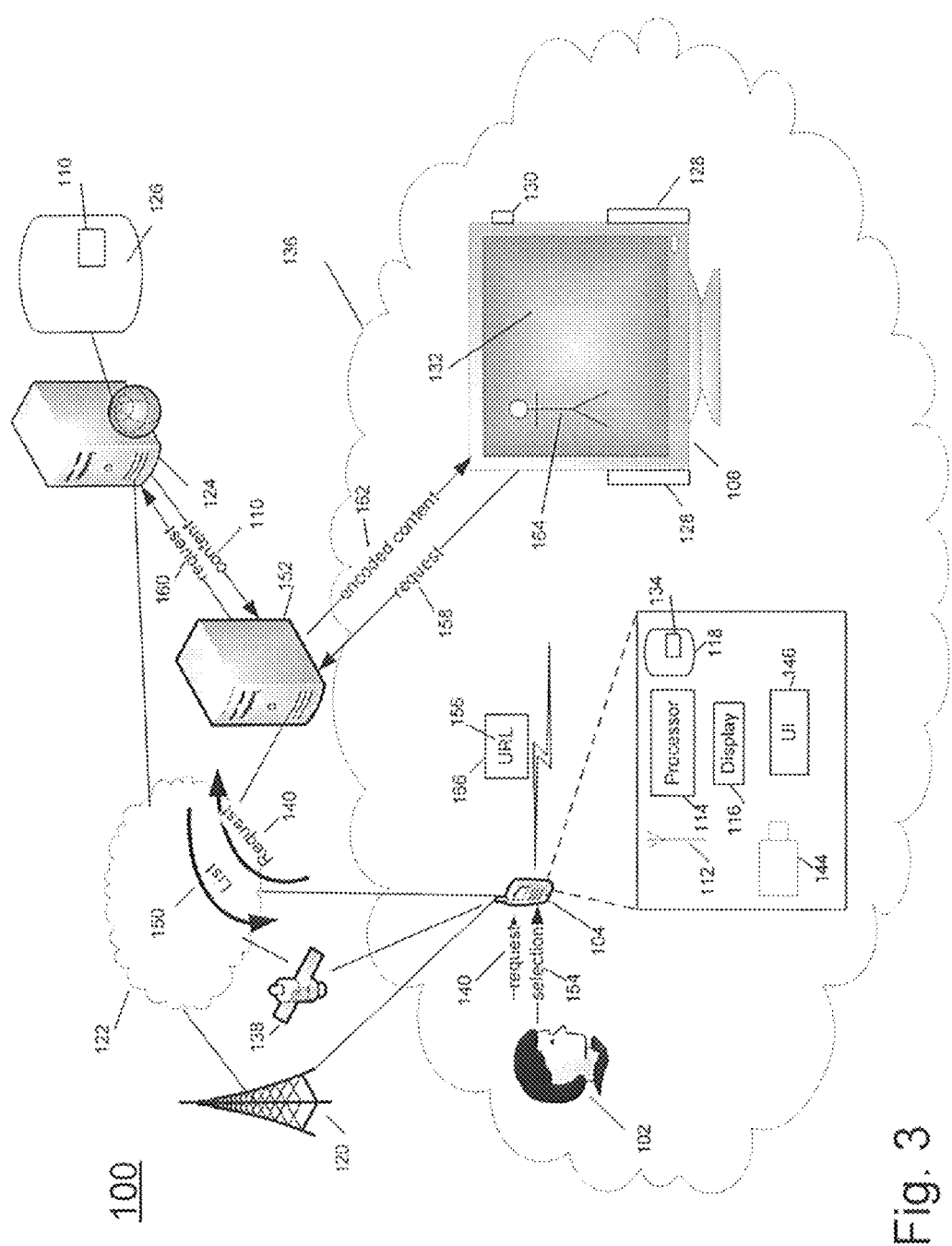
FIG. 3 is a system drawing of a system in accordance with an embodiment of the invention.

Referring to FIG. 3, there is shown more detail of system 100. Mobile phone 104 may be in communication with media rendering device 108 through network 136. Network 136 may be, for example, a wireless network such as a home wireless network. Media rendering device 108 may be, for example, a television, a monitor, a computer, an audio system, a gaming console such as the XBOX 360, SONY PLAYSTATION, NINTENDO WII, a dedicated media player like POPCORN HOUR, etc. Media rendering device 108 may include a network port 130, such as an Ethernet port, which may operate using a UPnP (Universal Plug and Play), DLNA (Digital Living Network Alliance), OpenTV or JointSpace protocols). Media rendering device 108 may output content through, for example, a display 132, speakers 128 or a combination thereof.

Mobile phone 104 may be in communication with network 122, such as the Internet, either directly or through a cellular base station 120, satellite 138 or through network 136. Network 122, in turn, is in communication with content processor 124 or content gateway 152. Content processor 124 is in communication with a memory 126 that may store content 110. Content 110 may be, for example, video, audio, or audio-visual content.

Mobile phone 104 may include an antenna 112, a display 116, a memory 118, a user interface 146 and a camera 144 all in communication with a processor 114. Antenna 112 may enable wireless communications with media rendering device 108, base station 120, satellite 138 and network 122. Memory 118 may store an application 134 that may be used to request content 110.

In use, user 102 may make a request 140 for available content from content processor 124. Request 140 may be in response to a prompt generated by application 134. Mobile phone 104 may send request 140 to content processor 124 or to a gateway processor 152. Phone 104 may send request 140 to content processor 124 through network 122 such as through base station 120, satellite 138 or through network 136. Similarly, phone 104 may send request 140 to gateway processor 152 through base station 120, satellite 138 or through network 136. Request 140 may include an identification of user 102. Content processor 124 or gateway processor 152 receives request 140 and determines a list of content available to user 102 based on the identification of user 102. For example, content processor 124 or gateway processor 152 may determine whether user 102 has a valid subscription or may generate the list based on a geographic location of mobile phone 104. In this way, content processor 124 or gateway processor 152 may be effective to enforce geographic restrictions on content distribution.

Content processor 126 or gateway processor 152 may send list of available content 150 to mobile phone 104. For example, if content processor 126 is associated with a television or radio station, list of available content 150 may include a list of content 110 that the television or radio station is willing to provide around the time when phone 104 sent request 140. List 150 may thus be based on a time of request 140. List 150 may be a catalog of sources of content available from multiple different content processors on the Internet and may be analogous to a television guide of the Internet.

Application 134 may cause mobile phone 104 to perform a discovery of media rendering devices within network 136. For example, mobile phone 104 may discover televisions in a local wireless network. In the discovery process, formatting or encoding requirements or other information relating to output parameters for each media rendering device may also be discovered. For example, if a media rendering device has a particular resolution capability, the discovery process may identify a model of the media rendering device and corresponding resolution. The discovery process may also identify supported audio and video encoders and decoders.

Application 134 may cause mobile phone 104 to display list 150 of available content and a list of available media rendering devices. Mobile phone 104 may receive a selection 154 from user 102 indicating desired content 110 and a desired media rendering device 108. The selection may come from user 102 using user interface 146. The selection may also come media rendering device 108 discovering application 134 and requesting the list of available content. User 102 may then use a remote control of media rendering device 108 to browse the list of available content and select the content to output. The media rendering device 108 may then send selection 154 for the selected content 110 to mobile phone 104. Application 134 may convert selection 154 into a command 106 including a URL 156 and send command 166 to media rendering device 108 using a UPnP, DLNA, OpenTV or JointSpace protocol. A domain of URL 156 may include an address of gateway processor 152 on the Internet. For example, URL 156 may be "1.2.3.4/xyz/jfk.ext" or "1.2.3.4/xyz.ext?x=jfk" where "1.2.3.4" is the IP address of gateway processor 152. In the example, "ext" may be a file extension, identifying a media type such as jpg or mp4. URL 156 may also include an identification or location of content processor 124, a location of content 110, and additional metadata such as outputting parameters relating to media rendering device 108. In the example, "xyz.ext" may indicate an encoded address where content 110 may be stored and "jfk" may indicate display requirements for media rendering device 108. For example, URL 156 may include information such as: an identification of user 102, an identification of a user session, a model or other identification of output parameters (such as supported audio and video encoders and decoders) of media rendering device 110, a type of mobile phone 104, etc. The user identification and/or identification of the user session may be used to track activity during a particular session. Targeted advertisements may then be inserted for the user as discussed in more detail below. Additionally, data that is fixed for the duration of a session, such as user name, user phone, location, etc., may be sent once and then subsequent requests may include only the identification of user session. Mobile phone 104 may encrypt URL 156 with a key known by gateway processor 152 so that a user 102 may have difficulty determining the location of content processor 124, the location of the content 110 and the additional metadata even though the data is in URL 156. Media rendering device 108 may receive command 166 and send a request 158 over the Internet to gateway processor 152 at the IP address in URL 156.

Gateway processor 152 may be located on the Internet at the domain indicated in URL 156. Gateway processor 152 may receive request 158 directed to URL 156. As mentioned above, URL 156 may include the domain of gateway processor 152 and may also include metadata indicating content processor 124. Gateway processor 152 may process the metadata, which may include decrypting URL 156, and send a request 160 to content processor 124 for content 110 based on the metadata. In response to request 160, content processor 124 may send content 110 to gateway processor 152. As URL 156 may include information regarding output parameters of media rendering device 108, gateway processor 152 may be able to encode content 110 into a format best suited for media rendering device 108. For example, if information regarding the output parameters includes a model of the particular media rendering device, content processor 124 may analyze a lookup table to determine how data should be encoded for the particular media rendering device. For example, content processor 124 may send content 110 to gateway processor 152 encoded so as to be rendered by a browser on a computer monitor. Gateway processor 152 may encode content 110 into encoded content 162 in a format more suitable for a television in examples where media rendering device 108 is a television. Gateway processor 152 may then send encoded content 162 to media rendering device 108. Media rendering device 108 may then output encoded content 162 through display 116 and/or speakers 128. Mobile phone 104 may then be used to provide playback commands to media rendering device 108 such as volume adjust, seek, pause, etc. through a DLNA, UPnP, JointSpace or OpenTV protocol.

In an example, user 102 may request that content from "website.com" be displayed by media rendering device 108. Phone 104 may send command 166 with URL 156 including the address for gateway processor 152 and for "website.com" along with metadata indicating a particular video. Gateway processor 152 may then request the content from "website.com", encode the content to a format supported by the media rendering device 108 and forward the content to the media rendering device.

In another example, mobile phone 104 may display a list of available televisions 110 or audio devices in local network 136. Mobile phone 104 may then provide a list of available movies or televisions stations available to display content. A user may send a request on his/her mobile phone indicating the output television and desired content from the Internet he/she wishes to see on the television. The request is sent to the television in the form of a command with a URL. A request is sent from the media rendering device to the gateway processor at the URL and then to the content processor. The content processor provides the content to the gateway processor and then to the television. Multiple media rendering devices may be controlled. For example, the mobile phone may be used to control audio to be played on a stereo and control a television to display video.

A system in accordance with this disclosure enables a mobile phone to act as an intelligent remote control to control a media rendering device to output content from the Internet. Prior art systems may require a dedicated software application running on the media rendering device for the media rendering device to render the content from the Internet. For example, each source of content may require a distinct software application running on the media rendering device. With the disclosed system, content providers can send content to a media rendering device without requiring a specific software application to be deployed at the media rendering device. A system in accordance with the disclosure need not necessarily store content from a content provider on a mobile phone or on a gateway processor. Content may be streamed to the media rendering device and so issues regarding ownership and distribution of the content may be addressed more easily. Content providers need not send the content to a location that is out of their control. Content providers thus have more control over distribution of content.

Other prior art systems may require a user to open a browser using their television. Many televisions do not have a browser and/or the user interface to type in a URL into a browser tends to be poor. A system in accordance with the disclosure can provide a typical television experience with the addition of content from the Internet that would otherwise only be available through a browser and may not have been encoded for the purpose of being displayed on a television. As a mobile phone may be used as the intelligent remote control, a system in accordance with the disclosure may provide a more personal experience. Prior art set top boxes may be shared by multiple users whereas mobile phones may be personalized to a user. Moreover, as the mobile phone is portable, a user can bring his control of content to any media rendering device. Activity of user 102 may be monitored and targeted advertisements may be provided to user 102, such as in content 110, on mobile phone 104 and/or on media rendering device 108 based on content 110. For example, advertising may be provided to user 102 in a variety of methods. The advertisements may be provided by inserting the advertisement into a content (video and/or audio) stream and displaying the advertisements on the media rendering device. The advertisements may be provided by displaying the advertisement on the mobile phone while the media rendering device outputs the content. The advertisements may be provided by displaying an advertisement on the mobile phone that is contest sensitive to the scene being rendered by the media rendering device. The advertisements may be displayed on the media rendering device over the content while allowing the user to respond to the advertisement on the mobile phone. Content available from a processor in a cloud environment may be outputted on a media rendering device. User 102 may use mobile phone 104 to search for content 110 available on the Internet and then use mobile phone 104 to display that content on media rendering device 108.

Figure 4:
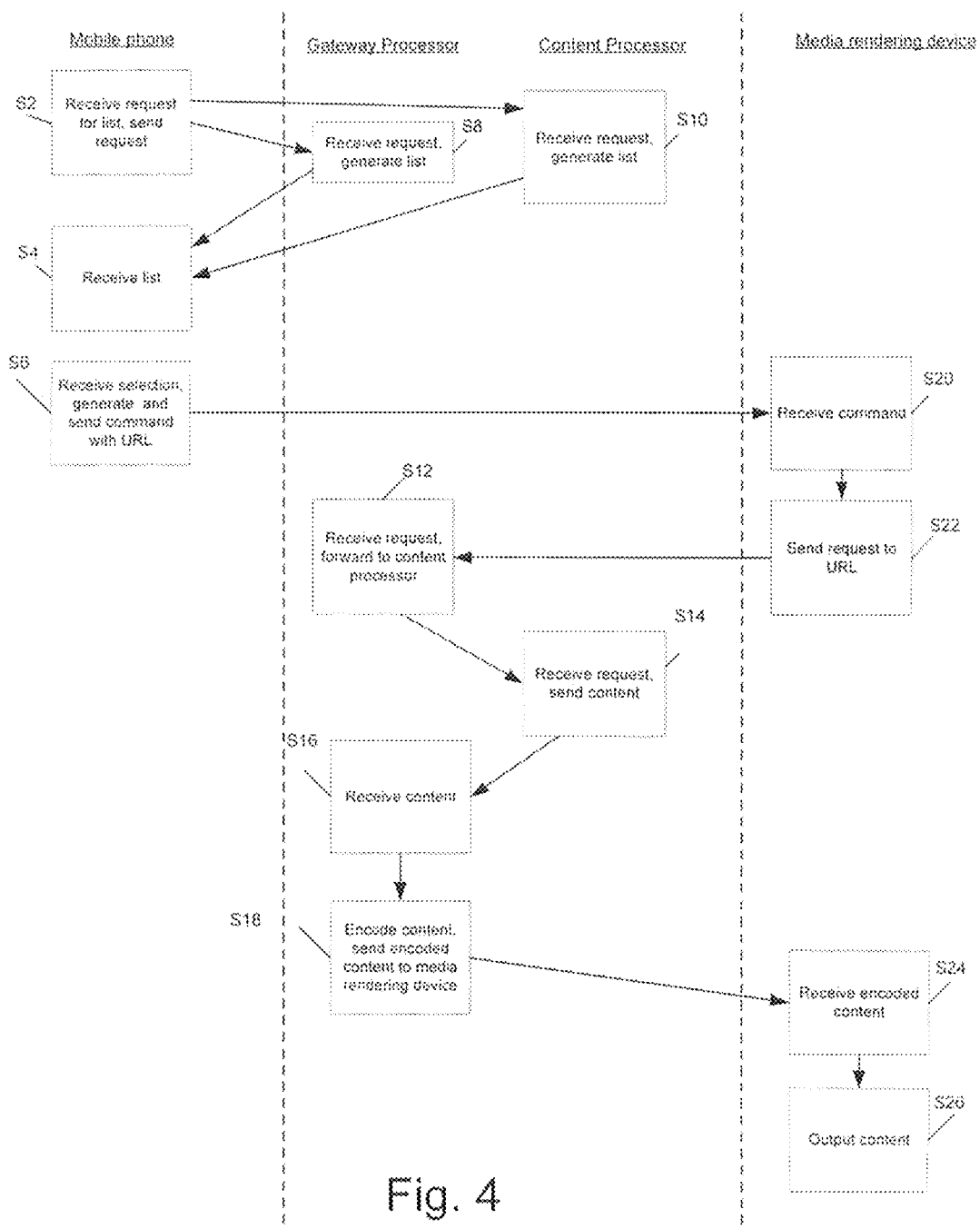
FIG. 4 is a flow chart illustrating a process in accordance with an embodiment of the invention.

Referring to FIG. 4, there is shown a process which could be performed in accordance with the disclosure. The process of FIG. 4 could be implemented using, for example, system 100 discussed above. As shown, at a step S2, a mobile phone may receive a request for a list of available content. The mobile phone may send the list to gateway processor or a content processor. At step S8, the gateway processor may receive the request and generate a list of available content. At step S10, the content processor may receive the request and generate a list of available content. At step S4, the mobile phone may receive the list of available content from the gateway processor or the content processor. At step S6, the mobile phone may receive a selection from the user to output at least some of the content. The selection may come from the user using a user interface on the mobile phone. The selection may also come from the user interacting with the media rendering device. For example, the media rendering device may discover the mobile phone and receive the list of available content. Thereafter, the media rendering device may receive a selection from the user to output content and the media rendering device may request the content from the mobile phone by generating the selection. The mobile phone may convert the selection into a command including a URL. The URL may include a domain for the gateway processor and an indication of the content processor such as an address of the content processor. The mobile phone may send the command to a media rendering device.

At step S20, the media rendering device may receive the command. At step S22, the media rendering device may send a request to the URL in the command. At step S12, the gateway processor may receive the request. The gateway processor may determine the address of the content processor from the URL and send a request to the content processor for the content. At step S14, the content processor may receive the request and send the content to the gateway processor. At step S16, the gateway processor may receive the content.

At step S18, the gateway processor may encode the content in a format based on outputting parameters of the media rendering device. The gateway processor may send the encoded content to the media rendering device. At step S24, the media rendering device may receive the encoded content. At step S26, the media rendering device may output the content.

While the invention has been described with reference to a number of exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from essential scope thereof. Therefore, it is intended that the invention not be limited to any particular exemplary embodiment disclosed herein.

What is claimed is:

1. A method for controlling output of content on one or more media rendering devices, the method comprising:

determining, by a mobile phone, output parameters of the one or more media rendering devices;

requesting, by the mobile phone, a content list from a content processor;

receiving, by the mobile phone, the content list;

receiving, by the mobile phone, a request for content in the content list, generating, by the mobile phone, a command based on the request, the command including a uniform resource locator, the uniform resource locator including a domain of a gateway processor, an identity of a particular one of the one or more media rendering devices; and an identity of a session for the particular one of the one or more media rendering devices;

sending, by the mobile phone, the command to the particular media rendering device to control the particular media rendering device to output the content during the session;

receiving, by the particular media rendering device, the command during the session;

sending a request from the particular media rendering device to the domain identified in the uniform resource locator during the session; and receiving the content by the particular media rendering device during the session.

2. The method as recited in claim 1, further comprising encrypting at least part of the uniform resources locator, by the mobile phone, before sending the command.

3. The method as recited in claim 1, wherein the request for content includes an identification of the user, and the list of content is based on the identification of the user.

4. The method as recited in claim 1, wherein the list of content is based on a geographical location of the mobile phone.

5. The method as recited in claim 1, further comprising displaying, by the mobile phone, an advertisement based on the content.

6. The method as recited in claim 1, further comprising sending, by the mobile phone to the particular media rendering device, playback commands effective to control output of the content by the particular media rendering device.

7. The method as recited in claim 1, further comprising:
determining, by the gateway processor, an address of the content processor based on the uniform resource locator; and
sending a request from the gateway processor to the content processor at the address of the content processor.

8. A method for controlling output of content on one or more media rendering devices, the method comprising:
determining, by a mobile phone, output parameters of the one or more media rendering devices;
requesting, by the mobile phone, a content list from a content processor;
receiving, by the mobile phone, the content list;
receiving, by the mobile phone, a request for content in the content list,
generating, by the mobile phone, a command based on the request, the command including a uniform resource locator, the uniform resource locator including a domain of a computing device accessible via a network, information or an identifier relating to the mobile phone, and information or an identifier relating to the output parameters of a particular one of the one or more media rendering devices;
sending, by the mobile phone, the command to the particular media rendering device to control the particular media rendering device to output the content;
receiving, by the particular media rendering device, the command;
sending a request from the particular media rendering device to the domain identified in the uniform resource locator; and
receiving the content by the particular media rendering device.

9. The method as recited in claim 8, further comprising encrypting at least part of the uniform resources locator, by the mobile phone, before sending the command.

10. The method as recited in claim 8, wherein the request for content includes an identification of the user, and the list of content is based on the identification of the user.

11. The method as recited in claim 8, wherein the list of content is based on a geographical location of the mobile phone.

12. The method as recited in claim 8, further comprising displaying, by the mobile phone, an advertisement based on the content.

13. The method as recited in claim 8, further comprising sending, by the mobile phone to the particular media rendering device, playback commands effective to control output of the content by the particular media rendering device.

14. The method as recited in claim 8, further comprising:
determining, by the computing device, an address of the content processor based on the uniform resource locator; and
sending a request from the computing device to the content processor at the address of the content processor.

15. A method for sending media rendering device information to a gateway processor, the method comprising:
determining, by a mobile phone, one or more output parameters of one or more media rendering devices, where the one or more output parameters include encoding requirements supported by the media rendering device, the encoding requirements relate to a resolution capability, an audio decoder, or a video decoder;
generating, by the mobile phone, media device information, including an identity of the one or more media rendering devices, information or an identifier relating to the mobile phone, and information or an identifier relating to the one or more output parameters of the one or more media rendering devices;
sending, by the mobile phone, the media device information to the gateway processor, wherein the sending of the media device information to the gateway processor occurs at a first time;
requesting, by the mobile phone, a content list from the gateway processor for content stored at a content processor, wherein the requesting of the content list from the gateway processor occurs at a second time, and wherein the second time is after the first time;
receiving, by the mobile phone, the content list;
receiving, by the mobile phone, a request for content in the content list;
generating, by the mobile phone, a command based on the request, the command including a uniform resource locator, the uniform resource locator including a domain of the gateway processor, information or an identifier relating to the mobile phone, and an identifier of a particular one of the one or more media rendering devices;
sending, by the mobile phone, the command to the particular media rendering device to control the particular media rendering device to output the content;
receiving, by the particular media rendering device, the command;
sending a request from the particular media rendering device to the domain identified in the uniform resource locator; and
receiving the content by the particular media rendering device.

16. The method of claim 15, further comprising encrypting at least part of the uniform resources locator, by the mobile phone, before sending the command.

* * * * *